United States Patent
Zhang et al.

(10) Patent No.: US 9,906,963 B2
(45) Date of Patent: Feb. 27, 2018

(54) BIG-DATA-MINING-BASED WIRELESS CHANNEL MODELING METHOD

(71) Applicant: BEIJING UNIVERSITY OF POSTS AND TELECOMMUNICATIONS, Beijing (CN)

(72) Inventors: Jianhua Zhang, Beijing (CN); Yujie Yang, Beijing (CN); Lei Tian, Beijing (CN); Ping Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 15/605,788

(22) Filed: May 25, 2017

(65) Prior Publication Data
US 2017/0374561 A1   Dec. 28, 2017

(30) Foreign Application Priority Data
Jun. 22, 2016 (CN) .......................... 2016 1 0456787

(51) Int. Cl.
*H04W 40/00* (2009.01)
*H04W 16/22* (2009.01)
*H04L 12/24* (2006.01)

(52) U.S. Cl.
CPC .......... *H04W 16/22* (2013.01); *H04L 41/142* (2013.01); *H04L 41/16* (2013.01)

(58) Field of Classification Search
CPC ..................................................... H04W 16/22
USPC ......................................................... 455/446
See application file for complete search history.

(56) References Cited

U.S. PATENT DOCUMENTS

2006/0183439 A1* 8/2006 Erceg ....................... H04B 7/06
                                                                  455/101

* cited by examiner

*Primary Examiner* — Joel Ajayi
(74) *Attorney, Agent, or Firm* — J.C. Patents

(57) ABSTRACT

The present disclosure provides a big-data-mining-based wireless channel modeling method comprising: obtaining image information of a measurement environment and a channel impulse response data sample under a preset condition; obtaining at least one multipath wave and a channel parameter of each of the multipath wave according to the channel impulse response data sample using a channel parameter estimation algorithm; and clustering the at least one multipath wave according to the channel parameter of each of the multipath wave using a clustering algorithm to obtain at least one cluster; obtaining at least one scattering object in the measurement environment according to the image information of the measurement environment; matching each of the cluster with each of the scattering object to obtain a cluster kernel which is a cluster matching with the scattering object; establishing, a base wireless channel model under the preset condition according to all of the cluster kernel.

10 Claims, 2 Drawing Sheets

BIG-DATA-MINING-BASED WIRELESS CHANNEL MODELING METHOD

CROSS-REFERENCE TO RELATED APPLICATION

This application claims priority to Chinese Patent Application No. 201610456787.1, filed on Jun. 22, 2016, which is hereby incorporated by reference in its entirety.

TECHNICAL FIELD

The present disclosure relates to the field of wireless channel modeling, and more particularly, to a big-data-mining-based wireless channel modeling method.

BACKGROUND

With the development of mobile communication technology, various indicators of the propagation path of radio waves (i.e., wireless channels), such as bandwidth, frequency band, antenna scale, etc., have increased greatly, leading to a sharp increase in the amount of data in wireless channels. The original wireless channel model is no longer applicable to the wireless channels having an increasing amount of data, cannot be used for simulation, testing and evaluation of the wireless channels, and thus cannot help the technical personnel analyze and improve the communication performance of the wireless channels.

When performing wireless channel modeling, the prior art usually employs a deterministic modeling method, in which a spatial model is established and transmission sources, reception points and material parameters are configured, so that a propagation characteristic of radio waves in a spatial model is obtained, and a wireless channel model is then obtained. This method has high complexity and mass calculation amount and requires a large storage space. At the same time, due to the great effect of environment and human factors on measured data, the accuracy of the wireless channel model is low.

SUMMARY

The present disclosure provides a big-data-mining-based wireless channel modeling method for solving the problems of high complexity, mass calculation amount and low accuracy of existing modeling methods.

The present disclosure provides a big-data-mining-based wireless channel modeling method, comprising:

obtaining image information of a measurement environment and a channel impulse response data sample under a preset condition, where the preset condition includes at least one of the following: a scenario type, an antenna configuration parameter or a frequency value;

obtaining at least one multipath wave and the channel parameter of each of the multipath wave according to the channel impulse response data sample by using a channel parameter estimation algorithm; and clustering the at least one multipath wave according to the channel parameter of each of the multipath wave by using a clustering algorithm to obtain at least one cluster;

obtaining at least one scattering object in the measurement environment according to the image information of the measurement environment;

matching each of the cluster with each of the scattering object to obtain a cluster kernel which is a cluster matching with the scattering object;

establishing a base wireless channel model under the preset condition according to all of the cluster kernel.

In the big-data-mining-based wireless channel modeling method as set forth above, the establishing a base wireless channel model under the preset condition according to all of the cluster kernel, may include:

obtaining the base wireless channel model under the preset condition according to all of the cluster kernel by using a machine learning algorithm.

In the big-data-mining-based wireless channel modeling method as set forth above, after establishing a base wireless channel model under the preset condition according to all of the cluster kernel, the method further may include:

obtaining a varying pattern of a channel characteristic, varying with the preset condition, according to the channel impulse response data samples under at least two different preset conditions by using a data mining method;

establishing, an extended wireless channel model under an arbitrary condition according to the arbitrary condition, the varying pattern and the base wireless channel model;

where, the varying pattern of the channel characteristic, varying with the preset conditions, includes at least one of the following: the varying pattern of the channel characteristic in a multi-antenna element, the varying pattern of the channel characteristic varying with frequency, and non-stationary of the channel characteristic varying with motion variations.

In the big-data-mining-based wireless channel modeling method as set forth above, the matching each of the cluster with each of the scattering object, may include:

determining a matched scattering object for each of the cluster in all of the scattering object by using a matching algorithm.

In the big-data-mining-based wireless channel modeling method as set forth above, the obtaining at least one scattering object in the measurement environment according to the image information of the measurement environment, may include:

performing texture recognition on the image information of the measurement environment to obtain at least one texture identification;

determining a corresponding scattering object for each of the texture identification according to each of the texture identification to obtain at least one scattering object in the measurement environment.

In the big-data-mining-based wireless channel modeling method as set forth above, the clustering at least one multipath wave according to the channel parameter of each of the multipath wave by using a clustering algorithm to obtain at least one cluster, may include:

clustering the at least one multipath wave according to a delay parameter, an amplitude parameter or an angle domain parameter in the channel parameter of each of the multipath wave by using the clustering algorithm to obtain the at least one cluster.

In the big-data-mining-based wireless channel modeling method as set forth above, the machine learning algorithm may refer to: a neural network linear iterative algorithm or a multi-layer neural network iterative algorithm.

In the big-data-mining-based wireless channel modeling method as set forth above, the matching algorithm may refer to: a Boosting algorithm, a neural network algorithm, or a classification decision tree algorithm.

The present disclosure provides a big-data-mining-based wireless channel modeling method which obtains a cluster kernel by clustering multipath waves and determining a corresponding scattering object for each of the cluster, and determines the wireless channel model according to the cluster kernel, thereby reducing the complexity of the wireless channel modeling method, decreasing the computation amount and improving the accuracy of the wireless channel modeling. By introducing the definition of cluster kernel and describing the wireless channel using a finite number of cluster kernels, the problem of increasing complexity of data and wireless channel brought by the expansion of future 5th generation mobile communication and future channel model in various dimensions of space-time-frequency can be solved.

BRIEF DESCRIPTION OF THE DRAWINGS

In order to more clearly state the technical solutions of the embodiments in the present application, the accompanying drawings used in the descriptions of the embodiments will be briefly illustrated, and apparently, the accompanying drawings described below are some embodiments of the present application, and other accompanying drawings can be obtained by those skilled in the art without delivering creative efforts.

DESCRIPTION OF EMBODIMENTS

In order to render a clearer description of the purpose, technical solutions and advantages of embodiments of the present disclosure, the technical solutions in the embodiments of the present disclosure will be described clearly and completely as follows in conjunction with drawings accompanying the embodiments of the present disclosure. And apparently, the described embodiments are just part rather than all of the embodiments of the present disclosure. All the other embodiments obtained by one with ordinary skill in the art based on the embodiments of the present disclosure without delivering creative efforts shall fall into the protection scope claimed by the present disclosure.

Aiming at the characteristic of an increasing amount of data in wireless channel modeling, the present disclosure provides a big-data-mining-based wireless channel modeling method by combining wireless channel modeling and data mining to address the problems of high complexity, mass calculation amount and inaccuracy of the existing modeling method. The executive entity of the method is a big-data-mining-based wireless channel modeling device that may be realized by software or hardware, which is not limited in present disclosure.

A detailed description of the big-data-mining-based wireless channel modeling method provided by the present disclosure will be given below with specific embodiments.

Figure 1:
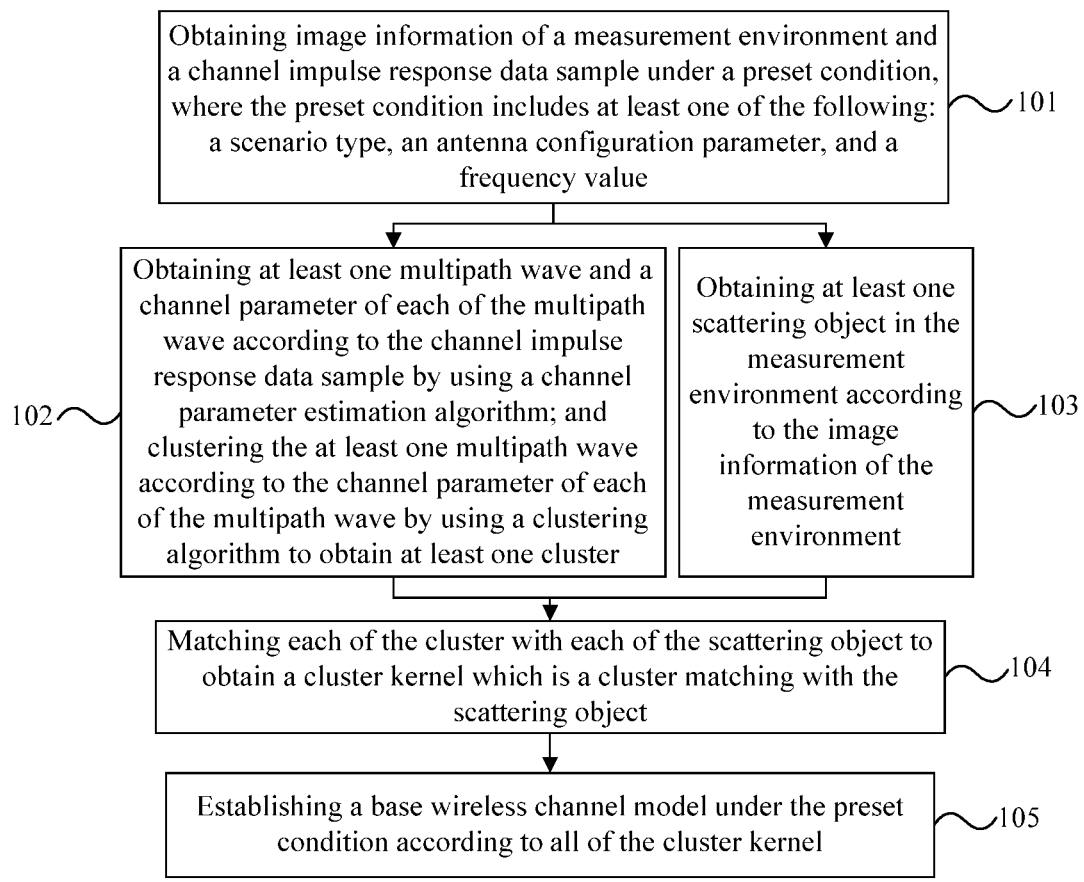
FIG. 1 is a flowchart of a first embodiment of a big-data-mining-based wireless channel modeling method provided by the present disclosure.

FIG. 1 is a flowchart of a first embodiment of a big-data-mining-based wireless channel modeling method provided by the present disclosure. As shown in FIG. 1, the method includes:

step 101: obtaining image information of a measurement environment and a channel impulse response data sample under a preset condition, where the preset condition includes at least one of the following: a scenario type, an antenna configuration parameter, and a frequency value;

step 102: obtaining at least one multipath wave and a channel parameter of each of the multipath wave according to the channel impulse response data sample by using a channel parameter estimation algorithm; and clustering the at least one multipath wave according to the channel parameter of each of the multipath wave by using a clustering algorithm to obtain at least one cluster;

step 103: obtaining at least one scattering object in the measurement environment according to the image information of the measurement environment;

step 104: matching each of the cluster with each of the scattering object to obtain a cluster kernel which is a cluster matching with the scattering object;

step 105: establishing a base wireless channel model under the preset condition according to the cluster kernel.

Herein, the above-described steps 102 and 103 do not have strict sequential execution order and can be executed at the same time.

Specifically, in step 101, for a measurement scenario under any preset condition, an image of the measurement environment and a channel impulse response data sample measured by the channel detecting device in the measurement scenario are first obtained. In an example, the condition may include: a scenario type, an antenna configuration parameter and a frequency value. For example, different antenna configurations and different frequency settings may be employed in different measurement scenes. For example, the configuration of measurement scenario may be: frequency point of 3.5 GHz, bandwidth of 200 MHz, and antenna of 6×32; different measurement scenarios also can be different environments where wireless channels locate, such as indoor scenes, as well as high-speed rail, cutting, viaduct, U-slot, tunnel and other outdoor scenes, which are indicated by the image of measurement environment. The wireless channels formed in different measurement scenarios are different, and the measured channel impulse response data samples are also different, so the corresponding wireless channel models are also different. Alternatively, the channel impulse response data sample and the image of measurement environment may be stored in a database. Then, at least one multipath wave under the preset condition is obtained according to the channel impulse response data sample by using a channel parameter estimation algorithm. For example, the channel parameter estimation algorithm may be space-alternating generalized expectation maximization (SAGE), multiple signal classification (MUSIC), estimating signal parameters via rotational invariance techniques (ESPRIT), principle component analysis (PCA), or kernel Fisher discriminant analysis (Kernel FDA), etc. For a measurement scenario under a preset condition, a signal source emits a radio wave which propagates in the measurement scenario. Upon meeting a scattering object in the measurement scenario, the radio wave may reflect, refract or diffract when passing through the scattering object, thereby obtaining multiple radio waves. When the multiple radio waves pass through other scattering objects in the measurement scenario, more multiple radio waves will be further obtained. The scattering objects may be glass, walls, tables, cabinets, trees and so on. Each radio wave travels from the signal source to the receiving end via a plurality of paths as described above, and such a phenomenon is called multipath wave. In the present disclosure, the waves on each path are referred to as multipath waves. Thus, a measurement scenario usually includes at least one multipath wave, and the channel impulse response data samples obtained in each measurement scenario are a set of channel impulse response data sample of the at least one multipath wave. When measuring the channel impulse response data sample in a certain measurement scenario, the channel parameter estimation algorithm may be used to obtain at least one multipath wave in the measurement scenario. Specifically, each multipath wave corresponds to a channel impulse response data sample, and each multipath wave is described by using a channel parameter of the multipath wave. Specifically, the channel parameter of each multipath wave includes at least one of following: delay, amplitude, horizontal departure angle, horizontal arrival angle, pitch departure angle, pitch arrival angle, Doppler frequency or the like.

Specifically, in step 102, when a large number of multipath waves, among a plurality of multipath waves in the measurement scenario under the preset condition, pass through a scattering object, different characteristics of scattering and refraction will arise in accordance of different scattering objects, thereby showing obvious clustering of multipath waves. Therefore, a clustering algorithm can be used to cluster the at least one multipath wave in each measurement scenario to obtain at least one cluster in each measurement scenario. Different scattering objects have different effects on radio waves, and the radio waves passing through a scattering object have a commonality of the scattering object. For example, a smooth glass will reflect radio waves in another direction, dense leaves will scatter radio waves in all directions, and a solid wall will reflect and block most of the radio waves. Different clusters may correspond to different scattering objects.

Alternatively, in the clustering process, according to the delay parameter, amplitude parameter or angle domain parameter of the multipath wave in the channel parameters of each multipath wave, a clustering algorithm may be used to cluster at least one multipath wave to obtain at least one cluster.

That is, a plurality of multipath waves may be clustered in terms of delay, amplitude or angle domain of the multipath wave. Specifically, a k-means clustering algorithm or a k-neighbor algorithm may be used.

Specifically, in step 103, the image of measurement environment can, for example, be a scan chart, a satellite map or the like. According to the image of the measurement environment, a 3D scenario of the measurement environment is reconstructed under the preset condition, and each scattering object is recognized in the reconstructed 3D scene. In an example, texture recognition or image recognition can be directly performed on the image of the measurement environment to determine the scattering object.

Specifically, in step 104, since each cluster represents a characteristic of the scattering object in the measurement scenario under the preset condition, the cluster possesses a one-to-one corresponding relationship with the scattering object in the measurement scenario under the preset condition. Alternatively, when determining a mapping relationship between the cluster and the scattering object, a matching algorithm can be used to determine a matching scattering object for each cluster in all scattering objects. Specifically, the matching algorithm may be Boosting algorithm, neural network algorithm, classification decision tree algorithm and other machine learning algorithms, thereby obtaining the mapping relationship between the cluster and the scattering object in the measurement scenario under the preset condition. Alternatively, the mapping relationship between the cluster and the scattering object may be obtained from a historical-mapping table. The historical-mapping table storing the channel parameters of clusters of each scattering object in different measurement scenarios, may be stored in a database.

After determining the mapping relationship between the cluster and the scattering object, a cluster kernel can be determined. A cluster kernel is a cluster having a corresponding scattering object.

Specifically, after obtaining a plurality of clusters, cluster kernels are selected from all the clusters according to the image information of the measurement environment, so that the wireless channel model can be represented by a small number of cluster kernels. For example, a cluster kernel is a cluster that has a certain shape, possesses a mapping relationship with a scattering object in an actual propagation environment and is formed by a large number of waves clustering according to a certain rule. The cluster kernel can lead the generation of wireless channels in various scenarios and configurations.

Specifically, in step 105, the wireless channel model represents the characteristic of radio waves passing through all the scattering objects in the model, that is to say, the superposition of the characteristic of each scattering object, while the characteristic of a scattering object can be represented by the cluster kernel corresponding to the scattering object and therefore, the wireless channel model can be obtained according to the cluster kernel. Since a channel impulse response data sample corresponding to a multipath wave contained in a cluster kernel can represent the characteristic the radio wave has when passing through the scattering object corresponding to the cluster kernel, therefore, the wireless channel model in the measurement scenario can be obtained according to the channel impulse response data samples corresponding to the multipath waves contained in all cluster kernels under the preset condition. In an example, when the wireless channel model is obtained according to cluster kernels, each cluster kernel has a different effect on the wireless channel model and then has a different weight which is the same as that for the effect of a main scattering object on the measurement environment. Therefore, in order to obtain an accurate wireless channel model, the wireless channel model can be obtained according to the mapping relationship between the cluster kernels and scattering objects as well as each cluster kernel.

Alternatively, a cluster-kernel-based base wireless channel model under a preset condition can be obtained according to a cluster kernel, via machine learning methods such as supervised machine learning or Bayesian learning. Specifically, a neural network can be used to linearly superimpose the cluster kernels, or a multilayer neural network iterative algorithm can be used to obtain the base wireless channel model in the measurement scenario.

In an example, for a measurement scenario under a preset condition, the base wireless channel model H may also be obtained according to all cluster kernels $\hat{P}_k$ in the measurement scenario by using a formula $$H = \sum_{k=1}^{K} s_k F(\hat{P}_k);$$

Where, $\hat{P}_k$ represents the k-th cluster kernel, k is a positive integer of 1 to K, K represents a total number of cluster kernels in the measurement scenario, $F(\hat{P}_k)$ represents the channel impulse response data sample of cluster kernel $\hat{P}_k$, and $s_k$ represents the weight of the k-th cluster kernel $\hat{P}_k$.

The present disclosure provides a big-data-mining-based wireless channel modeling method which obtains a cluster kernel by clustering multipath waves and determining a corresponding scattering object for each of the cluster, and determines the wireless channel model according to the cluster kernel, thereby reducing the complexity of the wireless channel modeling method, decreasing the computation amount, and improving the accuracy of the wireless channel modeling. By introducing the definition of cluster kernel and describing the wireless channel using a finite number of cluster kernels, the problem of increasing complexity of data and wireless channel brought by the expansion of future 5th generation mobile communication and future channel model in various dimensions of space-time-frequency can be solved.

Figure 2:
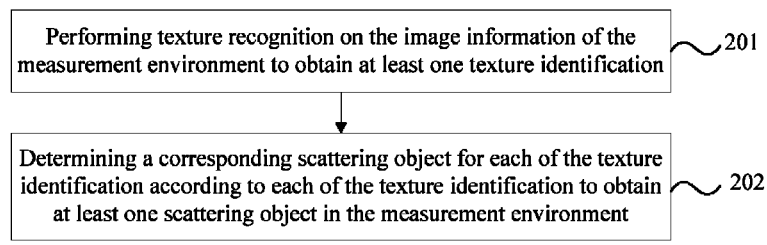
FIG. 2 is a flowchart of a second embodiment of a big-data-mining-based wireless channel modeling method provided by the present disclosure.

Further, on the basis of the above embodiment, the scattering object may be obtained based on the image of the measurement environment by using a method such as machine learning. Specifically, combined with FIG. 1, FIG. 2 is a flowchart of a second embodiment of a big-data-mining-based wireless channel modeling method provided by the present disclosure. As shown in FIG. 2, the method includes:

step 201: performing texture recognition on the image information of the measurement environment to obtain at least one texture identification;

step 202: determining a corresponding scattering object for each of the texture identification according to each of the texture identification to obtain at least one scattering object in the measurement environment.

Specifically, in step 201, texture information in different images of measurement environment is automatically recognized by using a computer vision algorithm, for example machine learning methods, such as an image recognition algorithm and etc., to obtain a texture identification each of which represents a scattering object in the measurement environment.

Specifically, in step 202, a respective scattering object is determined according to the texture identification, and then scattering object in the measurement environment is obtained. In an example, a scale-invariant feature transform (SIFT) may also be used to filter texture identification information and reduce information dimension, thereby filtering out unclear texture identifications from multiple texture identifications.

In an example, texture identifications may be extracted from the existing scattering objects to establish a texture library to facilitate the recognition of the scattering objects according to the texture identifications.

Alternatively, on the basis of any of the above embodiments, the clustering at least one multipath wave to obtain at least one cluster by using a clustering algorithm further includes:

preprocessing at least one multipath wave by using a principal component analysis algorithm or a kernel Fisher discriminant analysis (KFDA) algorithm to obtain at least one preprocessed multipath wave.

By using the above algorithm, the collected measurement data can be filtered and simplified to obtain more accurate measurement data, and then the k-means clustering algorithm or the k-neighborhood algorithm can be used to cluster the at least one preprocessed multipath wave.

Further, after conducting channel modeling under a plurality of preset conditions according to any of the embodiments described above, the present disclosure also adopts a machine learning algorithm to learn the above-described multiple channel modeling in the hope of establishing a wireless channel modeling under any condition.

Figure 3:
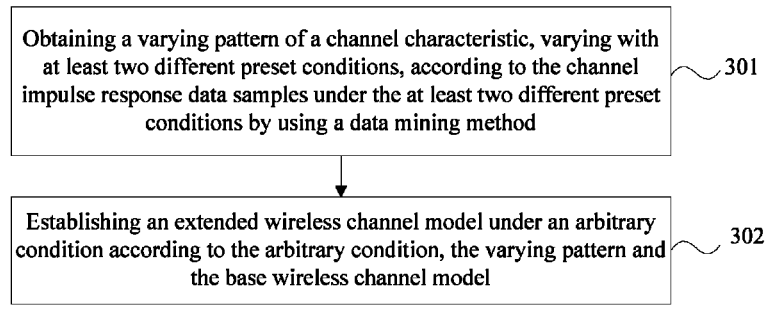
FIG. 3 is a flowchart of a third embodiment of a big-data-mining-based wireless channel modeling method provided by the present disclosure.

Specifically, FIG. 3 is a flowchart of a third embodiment of a big-data-mining-based wireless channel modeling method provided by the present disclosure. As shown in FIG. 3, the method includes:

step 301: obtaining a varying pattern of a channel characteristic, varying with at least two different preset conditions, according to the channel impulse response data samples under the at least two different preset conditions by using a data mining method;

step 302: establishing an extended wireless channel model under an arbitrary condition according to the arbitrary condition, the varying pattern and the base wireless channel model.

The varying pattern of the channel characteristic, varying with the preset conditions, includes at least one of the following: a varying pattern of the channel characteristic in a multi-antenna element, a varying pattern of the channel characteristic varying with frequency, and non-stationary of the channel characteristic varying with motion variations.

Specifically, after performing the big-data-mining-based wireless channel modeling method described in any of the above-described embodiments multiple times, in order to estimate the wireless channel model under an arbitrary condition (i.e., a wireless channel model with any configuration in any scenario at any frequency) according to the existing wireless channel model under the preset conditions, the varying pattern of the channel characteristic varying with multiple preset conditions can be established by performing in-depth data mining to the channel impulse response data samples under the multiple different preset conditions by using data mining methods such as main feature searching algorithm or dictionary learning algorithm, etc. Here, the channel characteristic obtained from the channel impulse response data samples represents the channel characteristic of an actual wireless channel.

Specifically, the varying pattern of the channel characteristic in a multi-antenna element indicates that the same channel has different spatial characteristics at different positions when the configuration of the antenna is different; the varying pattern of the channel characteristic varying with frequency is a frequency dependency, indicating whether the data sample in the current measurement scenario is at a specific frequency, such as 2 GHz, 6 GHz or 100 GHz; and the non-stationary of the channel characteristic varying with motion variations indicates whether the current measurement scenario is in a moving state, for instance, the current measurement scenario is a moving train carriage. By analyzing the above three characteristics, it can be concluded that the current measurement scenario is a moving scenario or a static scenario, an indoor scenario or an outdoor scenario, a scenario at a specific frequency or a scenario at any frequency.

Considering that the channel characteristic obtained according to the channel impulse response data samples under the preset conditions is related to the preset conditions, when it is desired to obtain a wireless channel model under an arbitrary condition, an extended wireless channel model can be established under the arbitrary condition according to the arbitrary condition, the varying pattern obtained in step 301 and the base wireless channel model.

By performing the in-depth characteristic mining in the present embodiment, the varying pattern of the channel characteristic, varying with the preset conditions, can be obtained, and further a wireless channel model in any scenario, with any configuration, and at any frequency can be obtained, thereby simplifying the establishing process of the channel model, reducing the calculation amount, and improving the accuracy of modeling.

Finally, it should be noted that, the above embodiments are merely meant to illustrate rather than limit the technical solutions of the present application; and although the present application has been concretely described in reference to the above embodiments, one with ordinary skill in the art shall understand that modifications can still be made to the technical solutions recorded in the foregoing embodiments, or that equivalent substitutions can still be made to part or all of the technical features therein; neither these modifications nor these substitutions shall make the essence of the corresponding technical solutions depart from the scope of the technical solutions in the above embodiments of the present application.

What is claimed is:

1. A big-data-mining-based wireless channel modeling method, comprising:
    obtaining image information of a measurement environment and a channel impulse response data sample under a preset condition, wherein the preset condition comprises at least one of: a scenario type, an antenna configuration parameter, or a frequency value;
    obtaining at least one multipath wave and a channel parameter of each of the multipath wave according to the channel impulse response data sample by using a channel parameter estimation algorithm; and clustering the at least one multipath wave according to the channel parameter of each of the multipath wave by using a clustering algorithm to obtain at least one cluster;
    obtaining at least one scattering object in the measurement environment according to the image information of the measurement environment;
    matching each of the cluster with each of the scattering object to obtain a cluster kernel which is a cluster matching with the scattering object;
    establishing a base wireless channel model under the preset condition according to the cluster kernel.

2. The method according to claim 1, wherein the establishing a base wireless channel model under the preset condition according to the cluster kernel comprises:
    obtaining a cluster-kernel-based base wireless channel model under the preset condition by using a machine learning algorithm.

3. The method according to claim 1, wherein after the establishing a base wireless channel model under the preset condition according to the cluster kernel, the method further comprises:
    obtaining a varying pattern of a channel characteristic, varying with the preset condition, according to channel impulse response data samples under at least two different preset conditions by using a data mining method;
    establishing, an extended wireless channel model under an arbitrary condition, according to the arbitrary condition, the varying pattern and the base wireless channel model;
    wherein the varying pattern of the channel characteristic, varying with the preset condition, includes at least one of: the varying pattern of the channel characteristic in a multi-antenna element, the varying pattern of the channel characteristic varying with frequency, and non-stationary of the channel characteristic varying with motion variations.

4. The method according to claim 1, wherein the matching each of the cluster with each of the scattering object comprises:
    determining a matched scattering object for each of the cluster in all of the scattering object by using a matching algorithm.

5. The method according to claim 1, wherein the obtaining at least one scattering object in the measurement environment according to the image information of the measurement environment comprises:
    performing texture recognition on the image information of the measurement environment to obtain at least one texture identification;
    determining a corresponding scattering object for each of the texture identification according to each of the texture identification to obtain at least one scattering object in the measurement environment.

6. The method according to claim 1, wherein the clustering the at least one multipath wave according to the channel parameter of each of the multipath wave by using a clustering algorithm to obtain at least one cluster, comprising:
    clustering the at least one multipath wave according to a delay parameter, an amplitude parameter or an angle domain parameter in the channel parameter of each of the multipath wave by using the clustering algorithm to obtain the at least one cluster.

7. The method according to claim 2, wherein after the establishing a base wireless channel model under the preset condition according to the cluster kernel, the method further comprises:
    obtaining a varying pattern of a channel characteristic, varying with the preset condition, according to channel impulse response data samples under at least two different preset conditions by using a data mining method;
    establishing, an extended wireless channel model under an arbitrary condition, according to the arbitrary condition, the varying pattern and the base wireless channel model;
    wherein the varying pattern of the channel characteristic, varying with the preset condition, includes at least one of: the varying pattern of the channel characteristic in a multi-antenna element, the varying pattern of the channel characteristic varying with frequency, and non-stationary of the channel characteristic varying with motion variations.

8. The method according to claim 2, wherein the matching each of the cluster with each of the scattering object comprises:
    determining a matched scattering object for each of the cluster in all of the scattering object by using a matching algorithm.

9. The method according to claim 2, wherein the obtaining at least one scattering object in the measurement environment according to the image information of the measurement environment comprises:
    performing texture recognition on the image information of the measurement environment to obtain at least one texture identification;
    determining a corresponding scattering object for each of the texture identification according to each of the texture identification to obtain at least one scattering object in the measurement environment.

10. The method according to claim 2, wherein the clustering the at least one multipath wave according to the channel parameter of each of the multipath wave by using a clustering algorithm to obtain at least one cluster, comprising:

clustering the at least one multipath wave according to a delay parameter, an amplitude parameter or an angle domain parameter in the channel parameter of each of the multipath wave by using the clustering algorithm to obtain the at least one cluster.

* * * * *